(12) United States Patent
Itoh et al.

(10) Patent No.: US 8,004,144 B2
(45) Date of Patent: Aug. 23, 2011

(54) ROTOR FOR AUTOMOTIVE ALTERNATOR HAVING MECHANISM FOR POSITIONING MAGNETIC POLE CORES

(75) Inventors: Kenji Itoh, Kariya (JP); Shigenobu Nakamura, Anjo (JP); Toshiki Hitomi, Nisshin (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/923,094

(22) Filed: Sep. 1, 2010

(65) Prior Publication Data

US 2011/0006633 A1 Jan. 13, 2011

Related U.S. Application Data

(62) Division of application No. 12/213,546, filed on Jun. 20, 2008, now abandoned.

(30) Foreign Application Priority Data

Jun. 20, 2007 (JP) ................................. 2007-161992
Jan. 17, 2008 (JP) ................................. 2008-007909

(51) Int. Cl.
*H02K 1/24* (2006.01)
*H02K 1/28* (2006.01)
*H02K 19/16* (2006.01)

(52) U.S. Cl. ........................................ 310/263; 310/42

(58) Field of Classification Search .................... 310/42, 310/263, 156.66–156.73, 216.113, 216.114, 310/216.129
See application file for complete search history.

(56) References Cited

U.S. PATENT DOCUMENTS

| 3,305,740 | A | 2/1967 | Shano |
| 4,882,515 | A | 11/1989 | Radomski |
| 5,097,169 | A * | 3/1992 | Fukushima ................... 310/263 |
| 5,361,011 | A | 11/1994 | York |
| 5,539,265 | A | 7/1996 | Harris et al. |
| 6,486,585 | B1 | 11/2002 | Badey et al. |
| 7,098,569 | B2 * | 8/2006 | Ong et al. ................... 310/261.1 |
| 7,170,206 | B2 | 1/2007 | Laxenaire et al. |
| 2004/0056559 | A1 | 3/2004 | Laxenaire et al. |

(Continued)

FOREIGN PATENT DOCUMENTS

JP U-58-145080 9/1983

(Continued)

OTHER PUBLICATIONS

Jun. 2, 2009 Notification of Reasons for Rejection issued in Japanese Patent Application No. 2008007909 (with translation).

(Continued)

*Primary Examiner* — Tran N Nguyen
(74) *Attorney, Agent, or Firm* — Oliff & Berridge, PLC

(57) ABSTRACT

A rotor for an automotive alternator includes a rotary shaft, first and second magnetic pole cores each having a plurality of magnetic pole claws, a bobbin, a field coil, a plurality of permanent magnets, and a positioning mechanism. The magnetic pole claws of the first magnetic pole core are interleaved with those of the second magnetic pole core. The field coil is wound around the first and second magnetic pole cores via the bobbin. The permanent magnets are interposed between the first and second magnetic pole cores. The positioning mechanism, which is made up of at least one of the rotary shaft, the first and second magnetic pole cores, and the bobbin, functions to position the first and second magnetic pole cores in the circumferential direction of the rotary shaft with intervals between adjacent pairs of the magnetic pole claws of the first and second magnetic pole cores being even.

3 Claims, 12 Drawing Sheets

U.S. PATENT DOCUMENTS

| | | |
|---|---|---|
| 2005/0236927 A1 | 10/2005 | Maeda et al. |
| 2007/0046137 A1 | 3/2007 | Ooiwa |

FOREIGN PATENT DOCUMENTS

| | | |
|---|---|---|
| JP | A-2004-520800 | 7/2004 |
| JP | A-2004-282845 | 10/2004 |
| JP | A-2005-312189 | 11/2005 |
| JP | A-2007-49787 | 2/2007 |

OTHER PUBLICATIONS

Apr. 21, 2010 Restriction Requirement issued in U.S. Appl. No. 12/213,546.

Jun. 16, 2010 Office Action issued in U.S. Appl. No. 12/213,546.

* cited by examiner

ROTOR FOR AUTOMOTIVE ALTERNATOR HAVING MECHANISM FOR POSITIONING MAGNETIC POLE CORES

CROSS-REFERENCE TO RELATED APPLICATION

This is a Division of U.S. patent application Ser. No. 12/213,546, filed Jun. 20, 2008. This application claims priority from Japanese Patent Applications No. 2007-161992, filed on Jun. 20, 2007, and No. 2008-7909, filed on Jan. 17, 2008. The disclosure of the prior applications is hereby incorporated by reference herein in its entirety.

BACKGROUND OF THE INVENTION

1. Technical Field of the Invention

The present invention relates generally to rotating electrical machines, such as electric generators and motors. More particularly, the invention relates to a rotor for an automotive alternator which includes a mechanism for positioning magnetic pole cores, and a method of manufacturing the rotor.

2. Description of the Related Art

There is known, for example from U.S. Pat. No. 6,486,585 B1, an automotive alternator that includes a plurality of permanent magnets each of which is interposed between two adjacent magnetic pole claws of a rotor to reduce the magnetic flux leakage between the two magnetic pole claws. With the reduction in the magnetic flux leakage, an increased amount of magnetic flux will be accordingly introduced from the rotor to a stator, thereby increasing the output power of the alternator.

However, referring to FIG. 14, in the automotive alternator disclosed in U.S. Pat. No. 6,486,585 B1, the magnetic pole claws are formed by: first assembling a pair of magnetic pole cores 2 and 3 onto a rotary shaft (not shown) of the rotor; and then machining the magnetic pole cores 2 and 3, leaving collar portions 2a and 3a on the respective outer peripheries of the magnetic pole cores 2 and 3. In addition, in FIG. 14, the reference numeral 24 indicates a milling tool that is used for machining the magnetic pole cores 2 and 3.

Accordingly, if the magnetic pole cores 2 and 3 could not be accurately positioned in the circumferential direction of the rotary shaft in the assembly step, the intervals between adjacent pairs of the magnetic pole claws in the circumferential direction would vary greatly. Thus, for a particular adjacent pair of the magnetic pole claws which have a large interval therebetween, the respective collar portions 2a and 2b would be left small in the subsequent machining step. Consequently, during high-speed rotation of the rotor, it would be difficult to securely hold the permanent magnet (not shown) interposed between the pair of the magnetic pole claws against centrifugal force. As a result, the permanent magnet would fly out of the space between the pair of the magnetic pole claws, causing a failure of the automotive alternator; for example, the permanent magnet may damage other components of the alternator, such as the stator and the field coil, or be caught in a small gap between the rotor and the stator, thereby locking the rotor.

To solve the above problem, one may consider machining the magnetic pole cores 2 and 3 prior to assembling those onto the rotary shaft. However, in this case, it is still necessary to accurately position the magnetic pole cores 2 and 3 in the circumferential direction in the assembly step, so as to make the intervals between adjacent pairs of the magnetic pole claws even. Accordingly, depending on the way of positioning the magnetic pole cores 2 and 3, a guidance device may be required to guide the magnetic pole cores 2 and 3 to desired positions in the assembly step, making the manufacturing process complicated and thus increasing the manufacturing cost of the rotor.

SUMMARY OF THE INVENTION

The present invention has been made in view of the above-mentioned problems.

According to one aspect of the present invention, there is provided a rotor for an automotive alternator, which includes a rotary shaft, a pair of first and second magnetic pole cores, a bobbin, a field coil, a plurality of permanent magnets, and a positioning mechanism.

Each of the first and second magnetic pole cores includes a hollow cylindrical boss portion, a disc portion, and a plurality of magnetic pole claws. The boss portion is fitted on the rotary shaft to rotate along with the rotary shaft. The disc portion extends radially outward from an axially outer part of the boss portion. Each of the magnetic pole claws axially extends from a radially outer part of the disc portion. The magnetic pole claws of the first magnetic pole core are interleaved with the magnetic pole claws of the second magnetic pole core. The bobbin is fitted on both the boss portions of the first and second magnetic pole cores. The field coil is wound around the bobbin. Each of the permanent magnets is interposed between adjacent two of the magnetic pole claws of the first and second magnetic pole cores in a circumferential direction of the rotary shaft, so as to reduce the magnetic flux leakage between the two magnetic pole claws. The positioning mechanism is made up of at least one of the rotary shaft, the first and second magnetic pole cores, and the bobbin. The positioning mechanism functions to position the first and second magnetic pole cores in the circumferential direction of the rotary shaft with intervals between adjacent pairs of the magnetic pole claws of the first and second magnetic pole cores being even.

With the positioning mechanism, the first and second magnetic pole cores are accurately positioned in the circumferential direction, with the intervals between adjacent pairs of the magnetic pole claws of the first and second magnetic pole cores being even. Consequently, it is possible to securely hold the permanent magnets between the adjacent pairs of the magnetic pole claws during high-speed rotation of the rotor.

In a preferred embodiment of the invention, the bobbin has at least one protrusion that is formed on a radially inner surface of the bobbin to extend in an axial direction of the rotary shaft. Each of the boss portions of the first and second magnetic pole cores has at least one recess that is formed on a radially outer surface of the boss portion to engage with the at least one protrusion of the bobbin. The at least one protrusion of the bobbin, the at least one recess of the boss portion of the first magnetic pole core, and the at least one recess of the boss portion of the second magnetic pole core together make up the positioning mechanism.

In another preferred embodiment of the invention, the first magnetic pole core has a protrusion that protrudes from an axial end face of the boss portion facing the second magnetic pole core. The second magnetic pole core has a recess that is recessed from an axial end face of the boss portion facing the first magnetic pole core, to engage with the protrusion of the first magnetic pole core. The protrusion of the first magnetic pole core and the recess of the second magnetic pole core together make up the positioning mechanism.

In yet another preferred embodiment of the invention, both the boss portions of the first and second magnetic pole cores are integrated into a common boss portion to the first and second magnetic pole cores. The common boss portion has two first engaging portions that are respectively provided on both axial end faces of the common boss portion. Each of the disc portions of the first and second magnetic pole cores has a second engaging portion that is provided on an axial end face of the disc portion to engage with a corresponding one of the first engaging portions of the common boss portion. The first engaging portions of the common boss portion and the second engaging portions of the disc portions of the first and second magnetic pole cores together make up the positioning mechanism.

In still another preferred embodiment of the invention, each of the first and second magnetic pole cores has a recess that is formed in a radially inner surface of the boss portion to extend in the axial direction of the rotary shaft. The rotary shaft has two protrusions that are formed on the outer surface of the rotary shaft to respectively engage with the recesses of the first and second magnetic pole cores. The recesses of the first and second magnetic pole cores and the protrusions of the rotary shaft together make up the positioning mechanism.

According to another aspect of the present invention, there is provided a method of manufacturing a rotor for an automotive alternator. The method includes the steps of:

(a) preparing a rotary shaft, a pair of first and second magnetic pole cores, a bobbin, a field coil, and a plurality of permanent magnets, the first and second magnetic pole cores each including a hollow cylindrical boss portion, a disc portion, and a plurality of magnetic pole claws, the disc portion extending radially outward from part of the boss portion, each of the magnetic pole claws axially extending from a radially outer part of the disc portion, wherein at least one of the rotary shaft, the first and second magnetic pole cores, and the bobbin makes up a positioning mechanism;

(b) assembling together the rotary shaft, the first and second magnetic pole cores, the bobbin, and the field coil so that: the boss portion of each of the first and second pole cores is fitted on the rotary shaft to rotate along with the rotary shaft, the magnetic pole claws of the first magnetic pole core are interleaved with the magnetic pole claws of the second magnetic pole core, the bobbin is fitted on both the boss portions of the first and second magnetic pole cores, and the field coil is wound around the bobbin, wherein the first and second magnetic pole cores are positioned, by means of the positioning mechanism, in a circumferential direction of the rotary shaft so that intervals between adjacent pairs of the magnetic pole claws of the first and second magnetic pole cores are made even;

(c) machining the first and second magnetic pole cores to tailor them for insertion of the permanent magnets therebetween; and (d) inserting the permanent magnets between the first and second magnetic pole cores, so that each of the permanent magnets is interposed between adjacent two of the magnetic pole claws of the first and second magnetic pole cores in the circumferential direction of the rotary shaft, so as to reduce the magnetic flux leakage between the two magnetic pole claws.

With the above method, since no guidance device is required for guiding the first and second magnetic pole cores to desired positions in the assembly step (b), the manufacturing cost of the rotor can be minimized.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
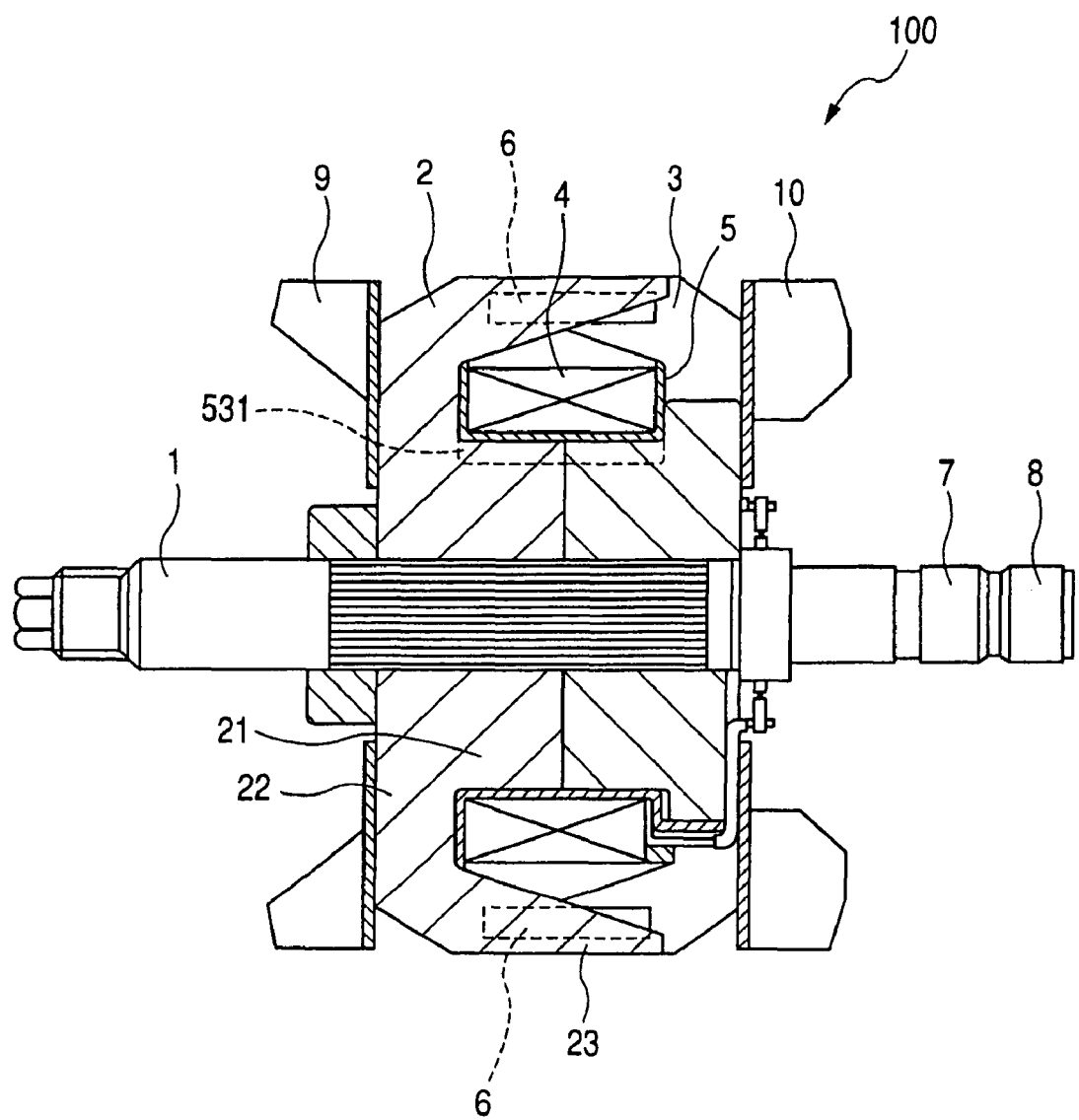
FIG. 1 is a partially cross-sectional view showing the overall configuration of a rotor, which is for use in an automotive alternator, according to the first embodiment of the invention.

Preferred embodiments of the present invention will be described hereinafter with reference to FIGS. 1-13.

It should be noted that, for the sake of clarity and understanding, identical components having identical functions in different embodiments of the invention have been marked, where possible, with the same reference numerals in each of the figures.

First Embodiment

FIG. 1 shows the overall configuration of a rotor 100 according to the first embodiment of the invention, which is designed for use in an automotive alternator.

As shown in FIG. 1, the rotor 100 includes a rotary shaft 1, a pair of lundell-type magnetic pole cores 2 and 3 that are fit on the rotary shaft 1, a field coil 4 that is wound around the magnetic pole cores 2 and 3 via a resin bobbin 5, a plurality of permanent magnets 6 interposed between the magnetic pole cores 2 and 3, a cooling fan 9 fixed to an axial end face of the magnetic pole core 2, and a cooling fan 10 fixed to an axial end face of the magnetic pole core 3.

The rotary shaft 1 is configured to be rotatably supported by a frame (not shown) of the alternator and to be driven by an engine of the vehicle on which the alternator is mounted. On a rear end portion of the rotary shaft 1, there is provided a pair of slip rings 7 and 8 for supplying field current to the field coil 4 during rotation of the rotor 100.

Each of the magnetic pole cores 2 and 3 includes a hollow cylindrical boss portion 21, a disc portion 22, and a plurality of (e.g., 6) magnetic pole claws 23. The boss portion 21 is serration-fit on the rotary shaft 1 to rotate along with the rotary shaft 1. The disc portion 22 is integrally formed with the boss portion 21 to extend radially outward from an axially outer part of the boss portion 21. Each of the magnetic pole claws 23 is integrally formed with the disc portion 22 to axially extend from a radially outer part of the disc portion 22.

The magnetic pole cores 2 and 3 are assembled together so that the magnetic pole claws 23 of the magnetic pole core 2 are interleaved with those of the magnetic pole core 3. Further, in a space surrounded by the boss portions 21, the disc portions 22, and the magnetic pole claws 23 of the magnetic pole cores 2 and 3, there is received the resin bobbin 5 with the field coil 4 wound therearound.

When the field current is supplied to the field coil 4 via the pair of slip rings 7 and 8, the magnetic pole cores 2A and 3A are magnetized to make up north and south poles, respectively. Each of the permanent magnets 6 is interposed between adjacent two of the magnetic pole claws 23 of the magnetic pole cores 2A and 3A so as to reduce the magnetic flux leakage between the two magnetic pole claws 23. More specifically, the permanent magnet 6 is interposed between the two magnetic pole claws 23 such that north and south poles of the permanent magnet 6 respectively face the same-polarity ones of the two magnetic pole claws 23. That is to say, the north pole of the permanent magnet 6 faces one of the two magnetic pole claws 23 which is magnetized to be north, while the south pole of the permanent magnet 6 faces the other magnetic pole claw 23 which is magnetized to be south.

Figure 2:
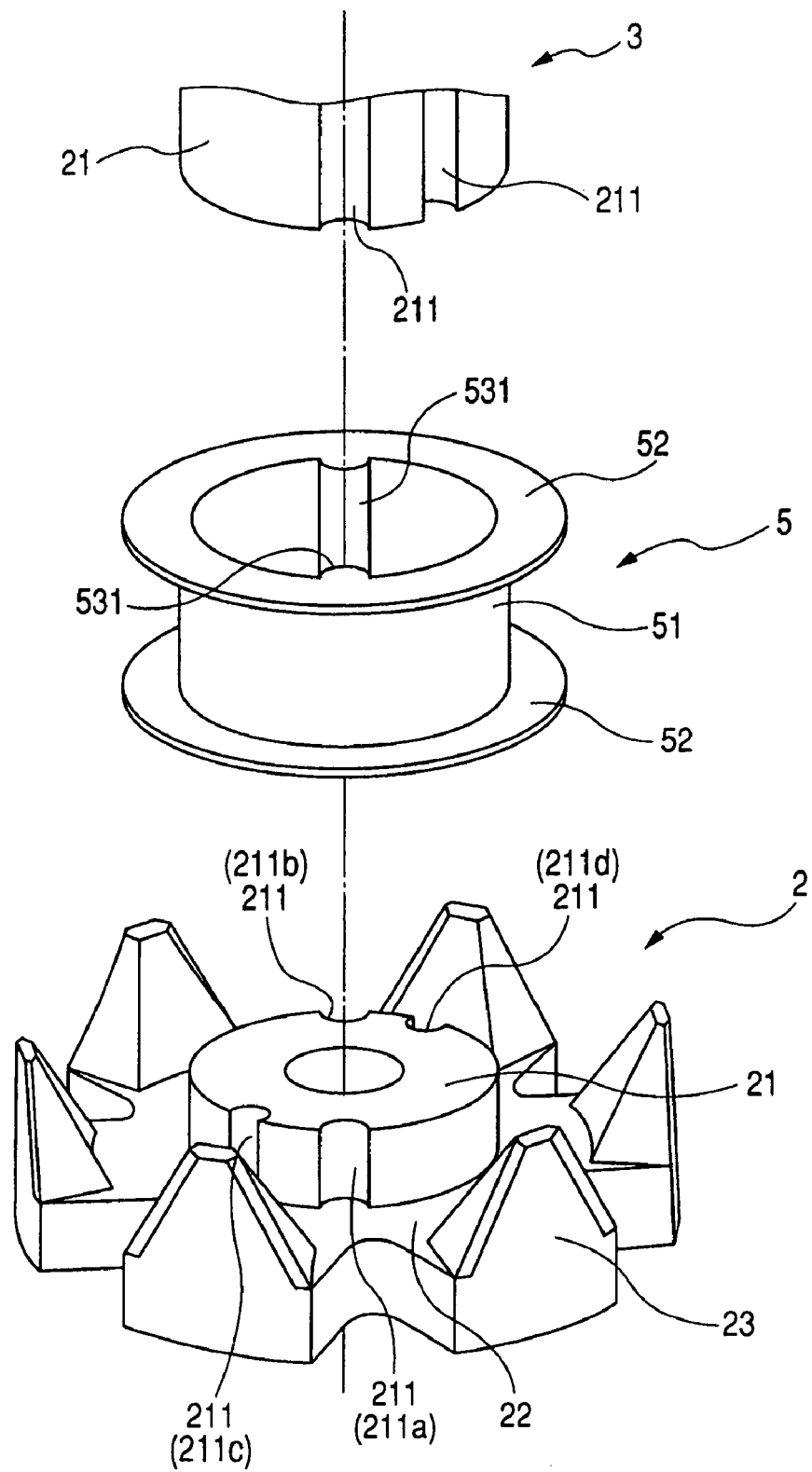
FIG. 2 is a perspective view illustrating the manner of assembling a resin bobbin and a pair of magnetic pole cores of the rotor, according to the first embodiment.

Referring now to FIG. 2, the manner of assembling the resin bobbin 5 and the magnetic pole cores 2 and 3 according to the present embodiment will be described hereinafter.

In the present embodiment, the resin bobbin 5 includes a cylindrical body portion 51, on which the field coil 4 is to be wound, a pair of flange portions 52 each extending radially outward from one axial end of the body portion 51, and a pair of protrusions 531 protruding from the radially inner surface of the body portion 51.

More specifically, in the present embodiment, the pair of protrusions 531 each continuously extend over the entire axial length of the body portion 51, and are offset from one another in the circumferential direction of the body portion 51 by 180°. Each of the protrusions 531 has a semi-circular cross section perpendicular to the axial direction of the body portion 51.

It should be noted that the shape of the cross section is not limited to the semi-circle. For example, the shape of the cross section may instead be a triangle or a square.

On the other hand, the boss portion 21 of the magnetic pole core 2 has formed, in the radially outer surface thereof, two pairs of recesses 211 that have a shape corresponding to that of the protrusions 531 of the resin bobbin 5 for engaging with the protrusions 531. The first pair of recesses 211 (i.e., 211a and 211b) are offset from one another in the circumferential direction of the boss portion 21 by 180°. The second pair of recesses 211 (i.e., 211c and 211d) are also offset from one another in the circumferential direction of the boss portion 21 by 180°. Further, the second pair of recesses 211 is offset from the first pair in the circumferential direction by one half of the pitch of the magnetic pole claws 23 of the magnetic pole core 2.

Moreover, the boss portion 21 of the magnetic pole core 3 has the same shape as that of the magnetic pole core 2. Accordingly, the boss portion 21 of the magnetic pole core 3 also has two pairs of recesses 211 identical to those of the boss portion 21 of the magnetic pole core 2.

In the assembly, as shown in FIG. 2, the resin bobbin 5 and the magnetic pole cores 2 and 3 are positioned to allow the pair of protrusions 531 of the resin bobbin 5 to engage with one of the two pairs of recesses 211 of each of the magnetic pole cores 2 and 3, leaving the other (i.e., unengaged) pairs of recesses 211 of the magnetic pole cores 2 and 3 respectively on both sides of the pair of protrusions 531 in the circumferential direction. Consequently, each of the magnetic pole claws 23 of the magnetic pole core 2 is circumferentially positioned at the center of the interval between one adjacent pair of the magnetic pole claws 23 of the magnetic pole core 3; vice versa, each of the magnetic pole claws 23 of the magnetic pole core 3 is circumferentially positioned at the center of the interval between one adjacent pair of the magnetic pole claws 23 of the magnetic pole core 2.

As above, in the rotor 100 according to the present embodiment, there is provided a positioning mechanism that is made up of the pair of protrusions 531 of the resin bobbin 5 and the pairs of recesses 211 of the boss portions 21 of the magnetic pole cores 2 and 3.

With the positioning mechanism, the magnetic pole cores 2 and 3 are accurately positioned in the circumferential direction of the rotary shaft 1, with the intervals between adjacent pairs of the magnetic pole claws 23 of the magnetic pole cores 2 and 3 being even. Consequently, it is possible to securely hold the permanent magnets 6 between the adjacent pairs of the magnetic pole claws 23 during high-speed rotation of the rotor 100.

Moreover, since no guidance device is required for guiding the magnetic pole cores 2 and 3 to desired positions in the assembly step, the manufacturing cost of the rotor 100 is kept from increasing.

The above-described rotor 100 according to the present embodiment can be made by a method that includes the following steps.

In the first step, all the components of the rotor 100, which include the rotary shaft 1, the magnetic pole cores 2 and 3, the field coil 4, the resin bobbin 5, and the permanent magnets 6, are prepared.

In the second step, the rotary shaft 1, the magnetic pole cores 2 and 3, the field coil 4, the resin bobbin 5 are assembled together.

In this assembly step, the magnetic pole cores 2 and 3 are positioned, by means of the positioning mechanism described above, in the circumferential direction of the rotary shaft 1, so that the intervals between adjacent pairs of the magnetic pole claws 23 of the magnetic pole cores 2 and 3 are made even.

In the third step, the magnetic pole cores 2 and 3 are machined, tailoring them for insertion of the permanent magnets 6 therebetween.

Figure 14:
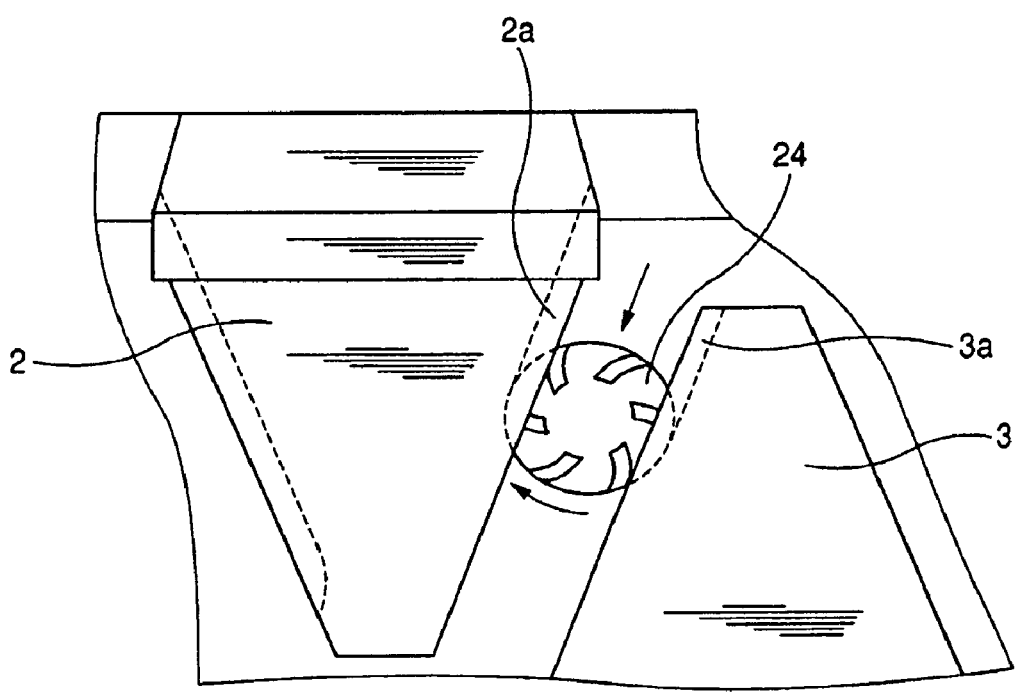
FIG. 14 is a partial elevation view illustrating a problem in the prior art.

For example, as described in the "Description of the Related Art" section with reference to FIG. 14, the magnetic pole cores 2 and 3 are machined, leaving collar portions 2a and 3a on the respective outer peripheries of the magnetic pole cores 2 and 3.

In the fourth step, the permanent magnets 6 are inserted between the first and second magnetic pole cores 2 and 3, so that each of the permanent magnets 6 is interposed between adjacent two of the magnetic pole claws 23 of the first and second magnetic pole cores 2 and 3 so as to the reduce magnetic flux leakage between the two magnetic pole claws 23.

In addition, the method may further include other steps well-known in the art, such as the step of making electrical connection between the field coil 4 and the slip rings 7 and 8; the description of those well-known steps are omitted hereinafter.

Modification 1

In the previous embodiment, each of the boss portions 21 of the magnetic pole cores 2 and 3 has two pairs of recesses 211 for engaging with the protrusions 531 of the resin bobbin 5, as shown in FIG. 2.

However, each of the boss portions 21 may have only two recesses 211 that are offset from one another by one half of the pitch of the magnetic pole claws 23 having the same polarity, e.g., either 211a and 211c or 211b and 211d in FIG. 2. In this case, it is still possible to accurately position the magnetic pole cores 2 and 3 when the size of the magnetic pole cores 2 and 3 is small. On the contrary, when the size of the magnetic pole cores 2 and 3 is large, it is also possible to secure the positioning accuracy by configuring the resin bobbin 5 to have more than one pair of protrusions 531 and each of the boss portions 21 to have more than two pairs of recesses 211.

Modification 2

In the previous embodiment, the resin bobbin 5 has, as shown in FIG. 2, the pair of protrusions 531 which continuously extend over the entire axial length of the body portion 51, and are offset from one another in the circumferential direction by 180°.

Figure 3:
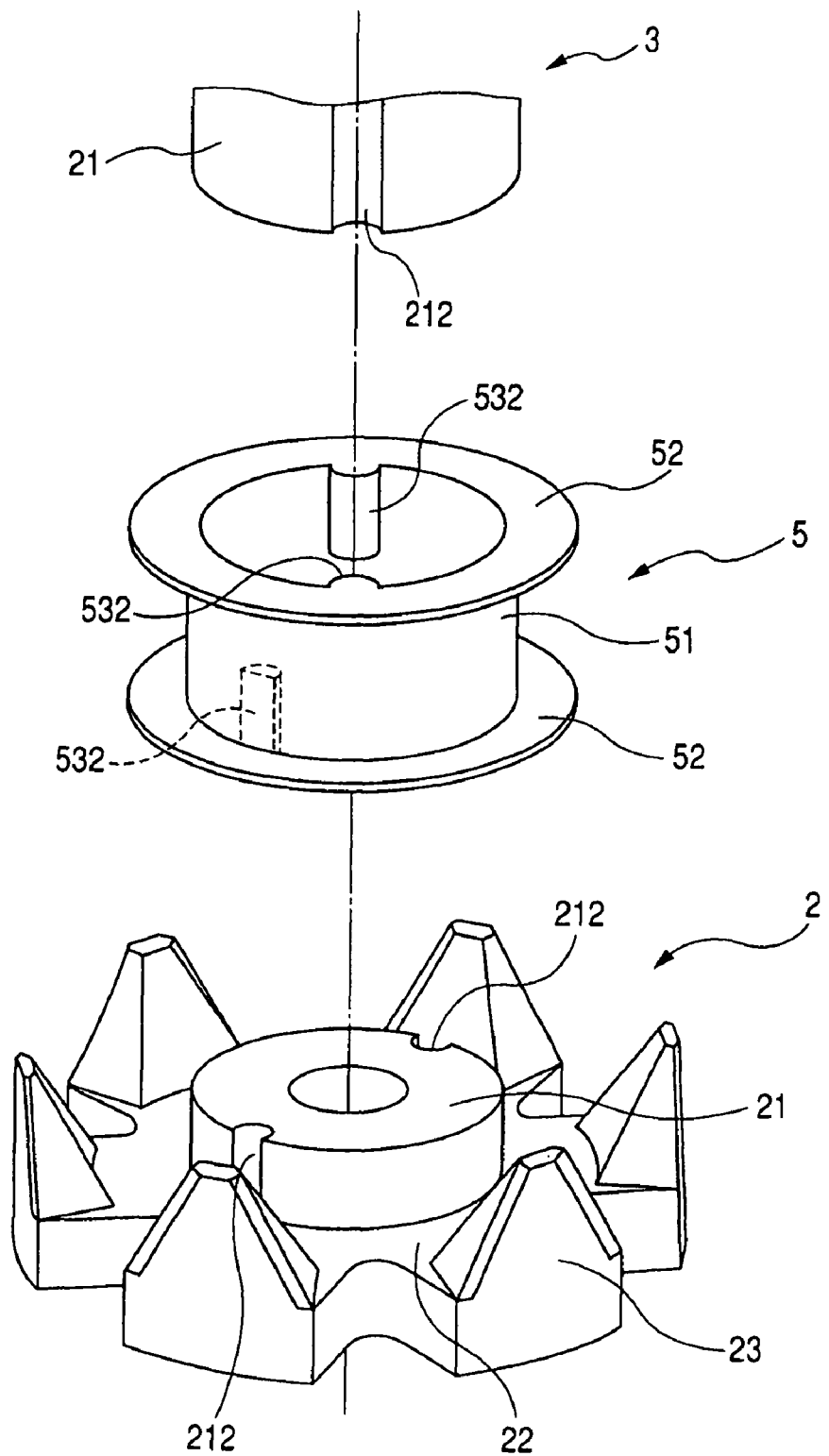
FIG. 3 is a perspective view illustrating a modification of the resin bobbin and magnetic pole cores of the rotor.

However, the resin bobbin 5 may alternatively have, as shown in FIG. 3, two pairs of protrusions 532. The first pair of protrusions 532 each extend from one axial end of the body portion 51 for a given axial length of the body portion 51, and are offset from one another in the circumferential direction by 180°. The second pair of protrusions 532 each extend from the other axial end of the body portion 51 for the given axial length, and are offset from one another in the circumferential direction by 180°. Further, the second pair of protrusions 532 is offset from the first pair in the circumferential direction by one half of the pitch of the magnetic pole claws 23 of the magnetic pole core 2. Moreover, the boss portion 21 of the magnetic pole core 2 has only one pair of recesses 212 to engage with the first pair of protrusions 532 of the resin bobbin 5; the boss portion 21 of the magnetic pole core 3 also has only one pair of recesses 212 to engage with the second pair of protrusions 532 of the resin bobbin 5. In this case, the relative position of the pair of recesses 212 to the magnetic pole claws 23 in the magnetic pole core 2 is identical to that in the magnetic pole core 3.

Accordingly, the magnetic pole cores 2 and 3 can have the same shape, thus making it possible to further reduce the manufacturing cost of the rotor 100. Moreover, by reducing the number of recesses in each of the magnetic pole cores 2 and 3, the output power of the alternator can be accordingly increased. In addition, since each of the magnetic pole cores 2 and 3 has only one pair of recesses 212 to engage with the corresponding pair of protrusions 532 of the resin bobbin 5, no mistake can occur in matching the pair of recesses 212 with the corresponding pair of protrusions 532.

Modification 3

Figure 4:
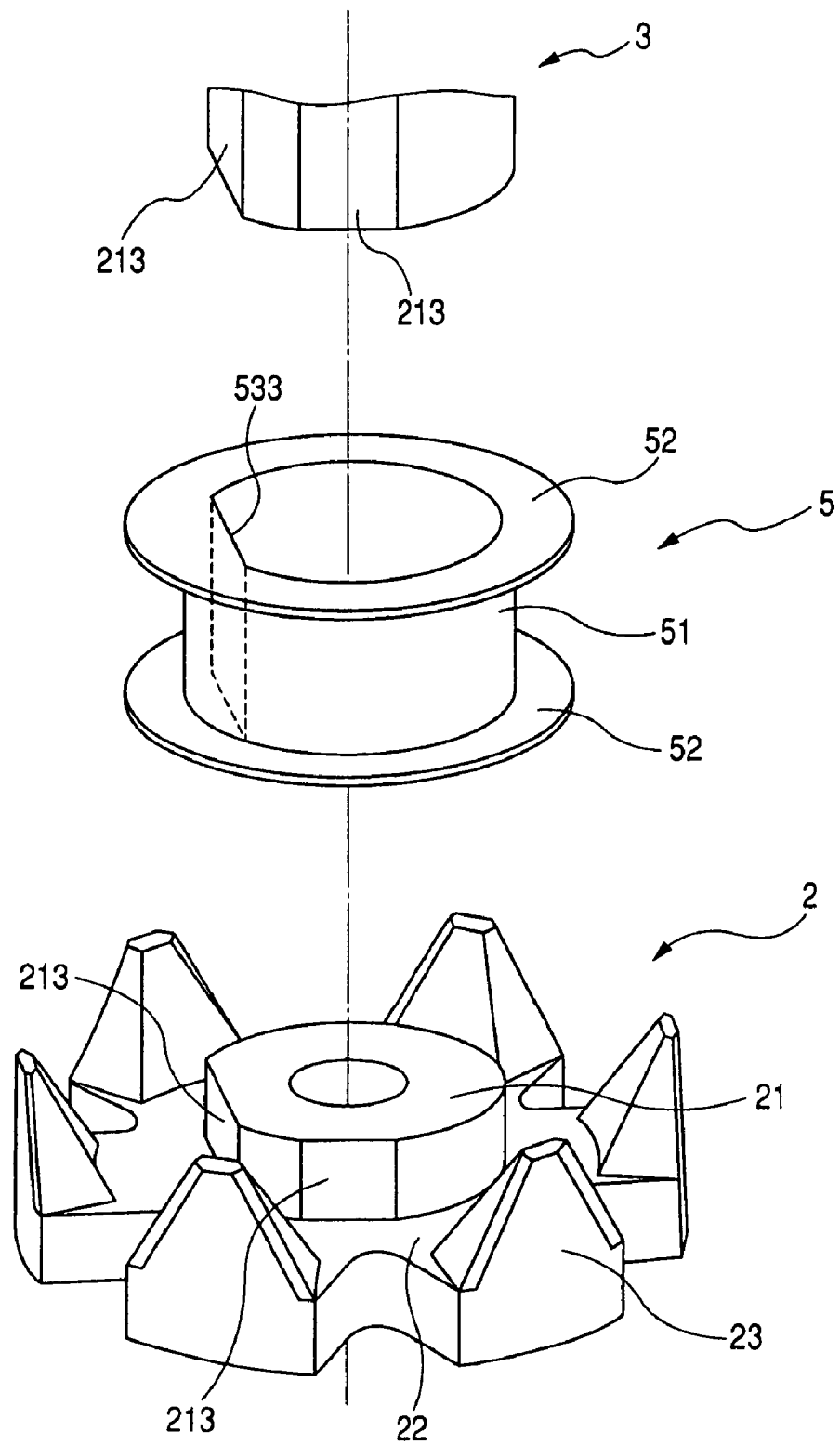
FIG. 4 is a perspective view illustrating another modification of the resin bobbin and magnetic pole cores of the rotor.

Referring to FIG. 4, the boss portion 21 of the magnetic pole core 2 may have, instead of recesses, two flat areas 213 on the radially outer surface of the boss portion 21 by cutting portions of the hollow cylindrical boss portion 21. Further, the two flat areas 213 are offset from one another in the circumferential direction of the boss portion 21 by one half of the pitch of the magnetic pole claws 23 of the magnetic pole core 2.

Moreover, in this case, the boss portion 21 of the magnetic pole core 3 has the same shape as that of the magnetic pole core 2. Accordingly, the boss portion 21 of the magnetic pole core 3 also has two flat areas 213 identical to those of the boss portion 21 of the magnetic pole core 2.

On the other hand, the resin bobbin 5 has, instead of protrusions, a flat area 533 on the radially inner surface of the body portion 51.

In the assembly, the resin bobbin 5 and the magnetic pole cores 2 and 3 are positioned to allow the flat area 533 of the resin bobbin 5 to engage with one of the two flat areas 213 of each of the magnetic pole cores 2 and 3, leaving the other (i.e., unengaged) flat areas 213 of the magnetic pole cores 2 and 3 respectively on both sides of the flat area 533 in the circumferential direction. Consequently, each of the magnetic pole claws 23 of the magnetic pole core 2 is circumferentially positioned at the center of the interval between one adjacent pair of the magnetic pole claws 23 of the magnetic pole core 3; vice versa, each of the magnetic pole claws 23 of the magnetic pole core 3 is circumferentially positioned at the center of the interval between one adjacent pair of the magnetic pole claws 23 of the magnetic pole core 2.

With the above configuration, both the making and assembling of the resin bobbin 5 and the magnetic pole cores 2 and 3 can be made simpler, reducing the manufacturing cost of the rotor 100.

In addition, the flat areas 213 and 533 may be replaced with curved areas which have a curvature different from that of the other area on the same surface.

Modification 4

This modification is a combination of the above-described modifications 2 and 3.

Figure 5:
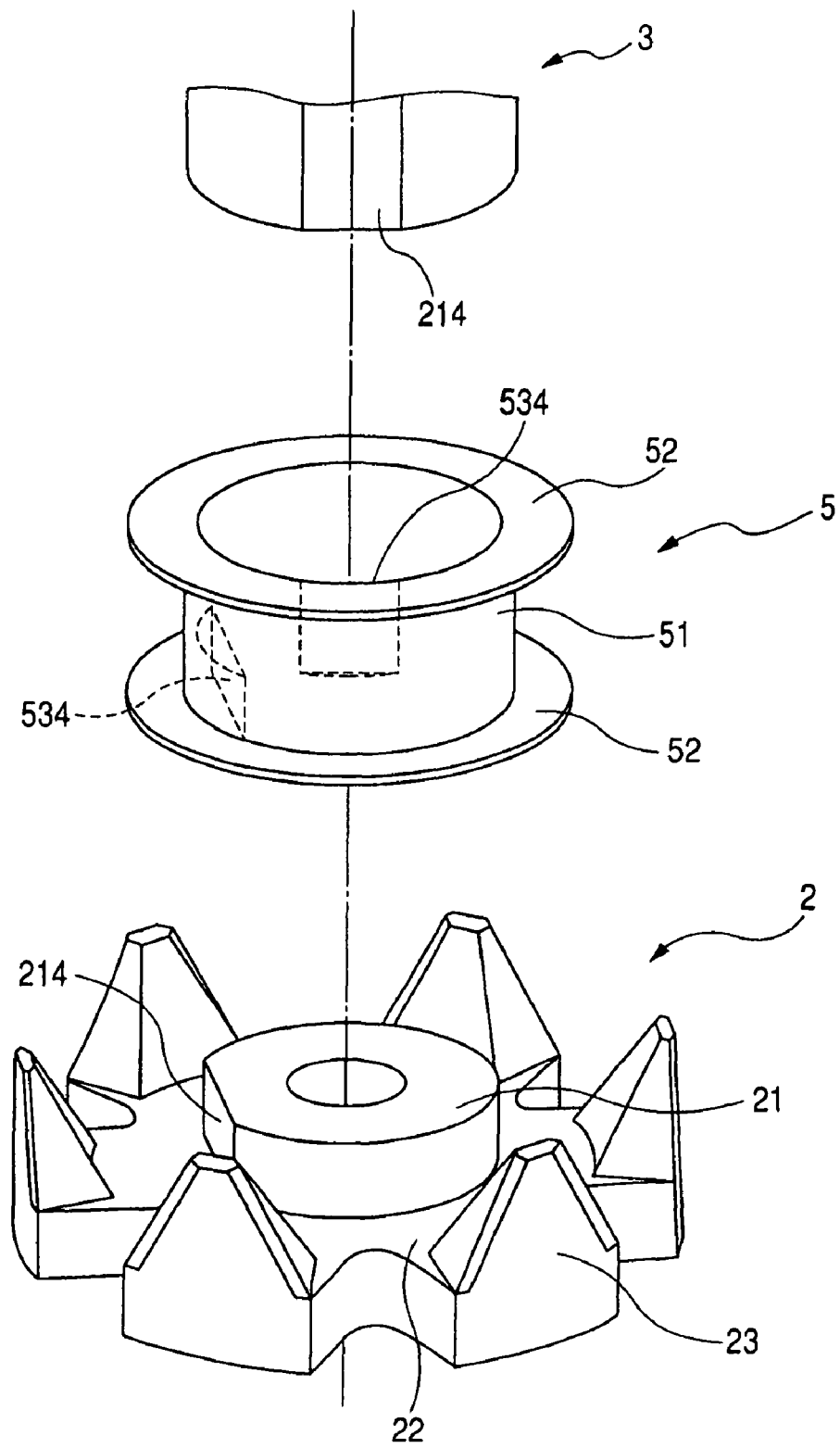
FIG. 5 is a perspective view illustrating yet another modification of the resin bobbin and magnetic pole cores of the rotor.

More specifically, referring to FIG. 5, the resin bobbin 5 may have two flat areas 534. The first flat area 534 extends from one axial end of the body portion 51 for a given axial length of the body portion 51. The second flat area 534 extends from the other axial end of the body portion 51 for the given axial length, and is offset from the first flat area 534 in the circumferential direction by one half of the pitch of the magnetic pole claws 23 of the magnetic pole core 2. Moreover, the boss portion 21 of the magnetic pole core 2 has only one flat area 214 to engage with the first flat area 534 of the resin bobbin 5; the boss portion 21 of the magnetic pole core 3 also has only one flat area 214 to engage with the second flat area 534 of the resin bobbin 5.

With the above configuration, it is possible achieve both the advantages of the modifications 2 and 3.

Modification 5

Figure 6:
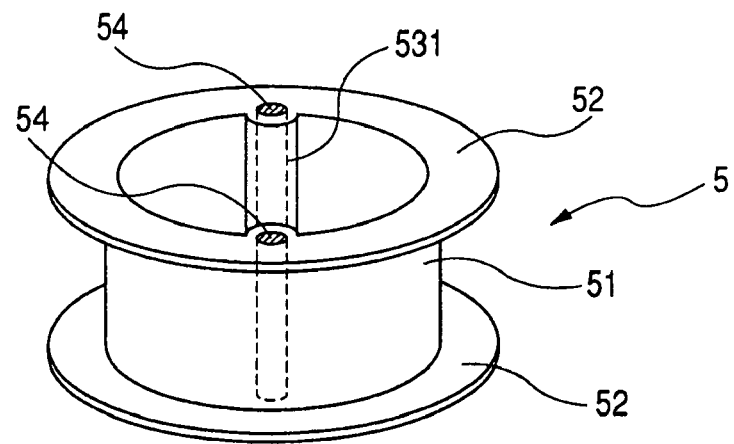
FIG. 6 is a perspective view illustrating a modification of the resin bobbin.

Referring to FIG. 6, it is also possible to modify the resin bobbin 5 of FIG. 2 to further include a magnetic member 54 inside each of the protrusions 531.

With the magnetic members 54, it is possible to compensate for the reduction in magnetic flux caused by the formation of the protrusions 531 in the resin bobbin 5 and the recesses 211 in the magnetic pole cores 2 and 3, thereby keeping the output power of the alternator from decreasing.

Modification 6

It is possible to use, instead of the resin bobbin 5, a metal bobbin that has the outer surface thereof treated to be electrically insulative.

Second Embodiment

Figure 7:
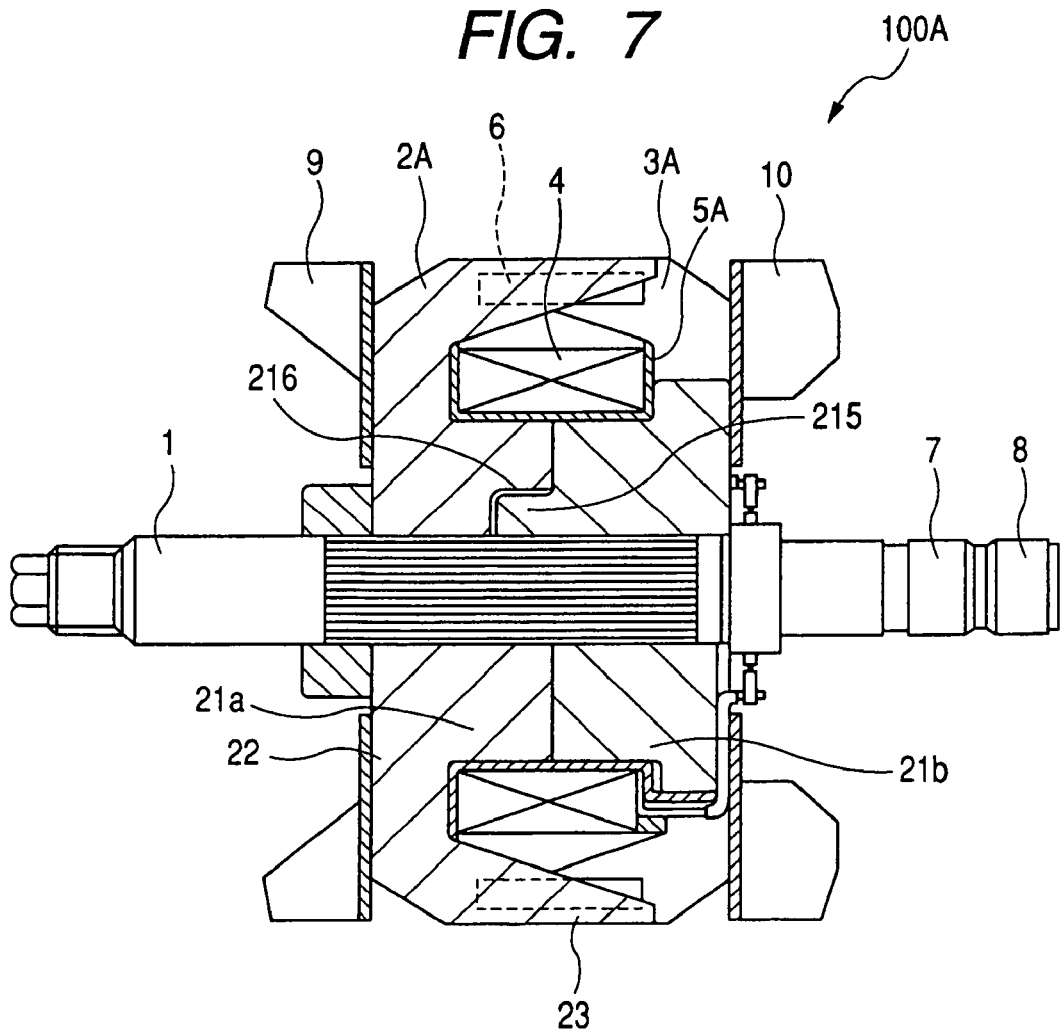
FIG. 7 is a partially cross-sectional view showing the overall configuration of a rotor according to the second embodiment of the invention.

FIG. 7 shows the overall configuration of a rotor 100A according to the second embodiment of the invention, which is also for use in an automotive alternator.

As shown in FIG. 7, the rotor 100A includes a rotary shaft 1, a pair of lundell-type magnetic pole cores 2A and 3A that are fit on the rotary shaft 1, a field coil 4 that is wound around the magnetic pole cores 2A and 3A via a resin bobbin 5A, a plurality of permanent magnets 6 interposed between the magnetic pole cores 2A and 3A, a cooling fan 9 fixed to an axial end face of the magnetic pole core 2A, and a cooling fan 10 fixed to an axial end face of the magnetic pole core 3A.

The magnetic pole core 2A includes a hollow cylindrical boss portion 21a, a disc portion 22, and a plurality of (e.g., 6) magnetic pole claws 23. The boss portion 21a is serration-fitted on the rotary shaft 1 to rotate along with the rotary shaft 1. The disc portion 22 is integrally formed with the boss portion 21a to extend radially outward from an axially outer part of the boss portion 21a. Each of the magnetic pole claws 23 is integrally formed with the disc portion 22 to axially extend from a radially outer part of the disc portion 22 toward the magnetic pole core 3A.

Similarly, the magnetic pole core 3A includes a hollow cylindrical boss portion 21b, a disc portion 22, and a plurality of (e.g., 6) magnetic pole claws 23. The boss portion 21b is serration-fit on the rotary shaft 1 to rotate along with the rotary shaft 1. The disc portion 22 is integrally formed with the boss portion 21b to extend radially outward from an axially outer part of the boss portion 21b. Each of the magnetic pole claws 23 is integrally formed with the disc portion 22 to axially extend from a radially outer part of the disc portion 22 toward the magnetic pole core 2A.

The magnetic pole cores 2A and 3A are assembled together so that the magnetic pole claws 23 of the magnetic pole core 2A are interleaved with those of the magnetic pole core 3A. Further, in a space surrounded by the boss portions 21a and 21b, the disc portions 22, and the magnetic pole claws 23 of the magnetic pole cores 2A and 3A, there is received the resin bobbin 5A with the field coil 4 wound there around.

When the field current is supplied to the field coil 4 via slip rings 7 and 8, the magnetic pole cores 2 and 3 are magnetized to make up north and south poles, respectively. Each of the permanent magnets 6 is interposed between adjacent two of the magnetic pole claws 23 of the magnetic pole cores 2A and 3A so as to reduce the magnetic flux leakage between the two magnetic pole claws 23. More specifically, the permanent magnet 6 is interposed between the two magnetic pole claws 23 such that north and south poles of the permanent magnet 6 respectively face the same-polarity ones of the two magnetic pole claws 23. That is to say, the north pole of the permanent magnet 6 faces one of the two magnetic pole claws 23 which is magnetized to be north, while the south pole of the permanent magnet 6 faces the other magnetic pole claw 23 which is magnetized to be south.

The resin bobbin 5A has almost the same structure as the resin bobbin 5 of FIG. 2. However, unlike the resin bobbin 5, the resin bobbin 5A of the present embodiment has no protrusion formed on the radially inner surface thereof.

Figure 8:
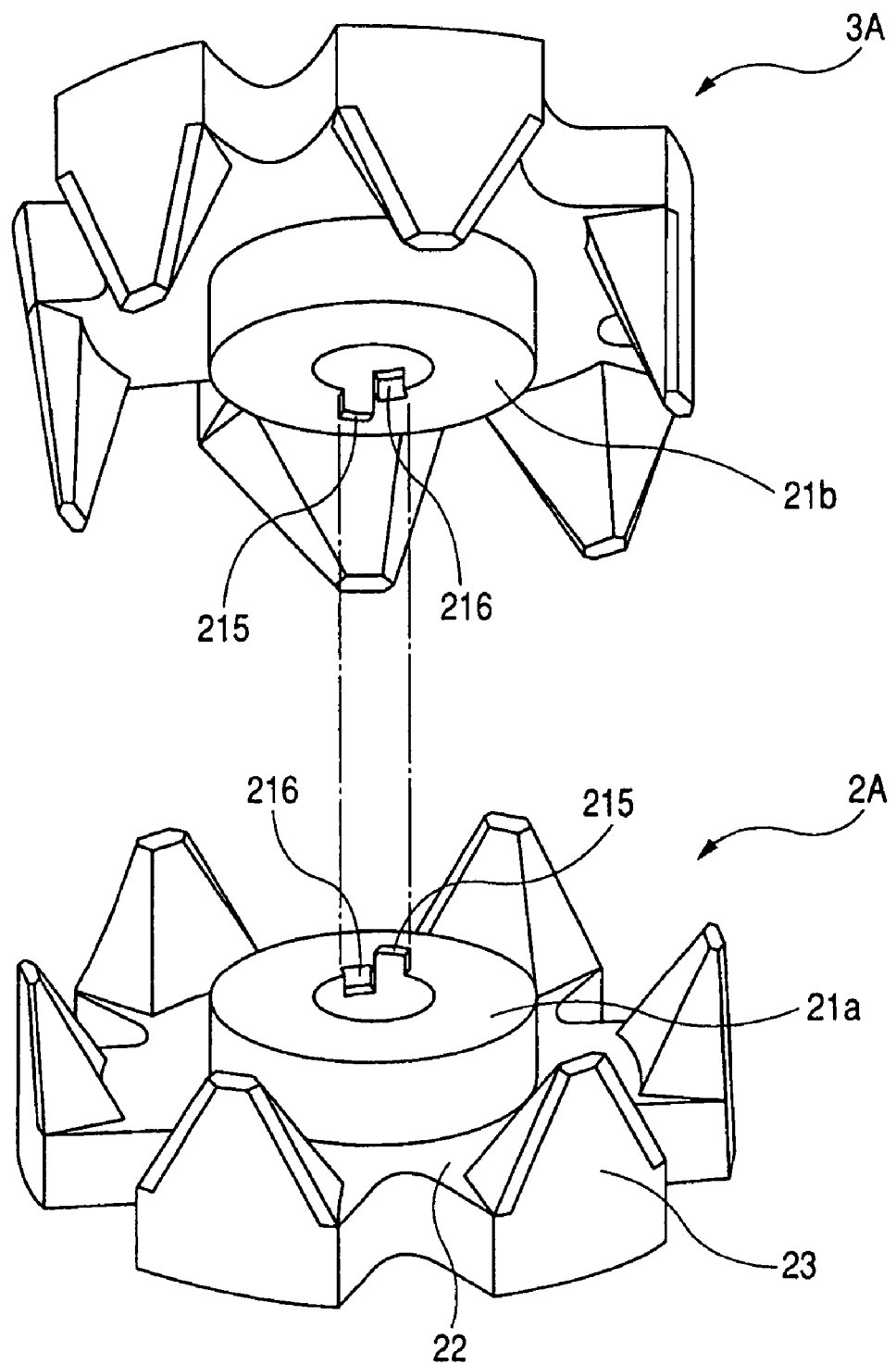
FIG. 8 is a perspective view illustrating the manner of assembling a pair of magnetic pole cores of the rotor, according to the second embodiment.

Referring now to FIG. 8, the manner of assembling the magnetic pole cores 2A and 3A according to the present embodiment will be described hereinafter.

In the present embodiment, the magnetic pole core 2A has a protrusion 215, which protrudes from the axial end face of the boss portion 21a facing the magnetic pole core 3A, and a recess 216 that is recessed from the axial end face of the boss portion 21a. The circumferential centers of the protrusion 215 and recess 216 are spaced by one half of the pitch of the magnetic pole claws 23 of the magnetic pole core 2A.

On the other hand, the magnetic pole core 3A also has a protrusion 215 and a recess 216. The protrusion 215 protrudes from the axial end face of the boss portion 21b facing the magnetic pole core 2A, to engage with the recess 216 of the magnetic pole core 2A. The recess 216 is recessed from the axial end face of the boss portion 21b to engage with the protrusion 215 of the magnetic pole core 2A. Accordingly, the circumferential centers of the protrusion 215 and recess 216 of the magnetic pole core 3A are also spaced by one half of the pitch of the magnetic pole claws 23 of the magnetic pole core 3A.

After the assembly of the magnetic pole cores 2A and 3A through the engagements between the protrusions 215 and recesses 216, each of the magnetic pole claws 23 of the magnetic pole core 2A is circumferentially positioned at the center of the interval between one adjacent pair of the magnetic pole claws 23 of the magnetic pole core 3A; vice versa, each of the magnetic pole claws 23 of the magnetic pole core 3A is circumferentially positioned at the center of the interval between one adjacent pair of the magnetic pole claws 23 of the magnetic pole core 2A.

As above, in the rotor 100A according to the present embodiment, there is provided a positioning mechanism that is made up of the pairs of protrusion 215 and recess 216 of the magnetic pole cores 2A and 3A.

With the positioning mechanism, the magnetic pole cores 2A and 3A are accurately positioned in the circumferential direction of the rotary shaft 1, with the intervals between adjacent pairs of the magnetic pole claws 23 of the magnetic pole cores 2A and 3A being even. Consequently, it is possible to securely hold the permanent magnets 6 between the adjacent pairs of the magnetic pole claws 23 during high-speed rotation of the rotor 100A.

Moreover, since no guidance device is required for guiding the magnetic pole cores 2A and 3A to desired positions in the assembly step, the manufacturing cost of the rotor 100A is kept from increasing.

In addition, the rotor 100A according to the present embodiment can be made in the same way as the rotor 100 according to the first embodiment.

Modification 7

Figure 9:
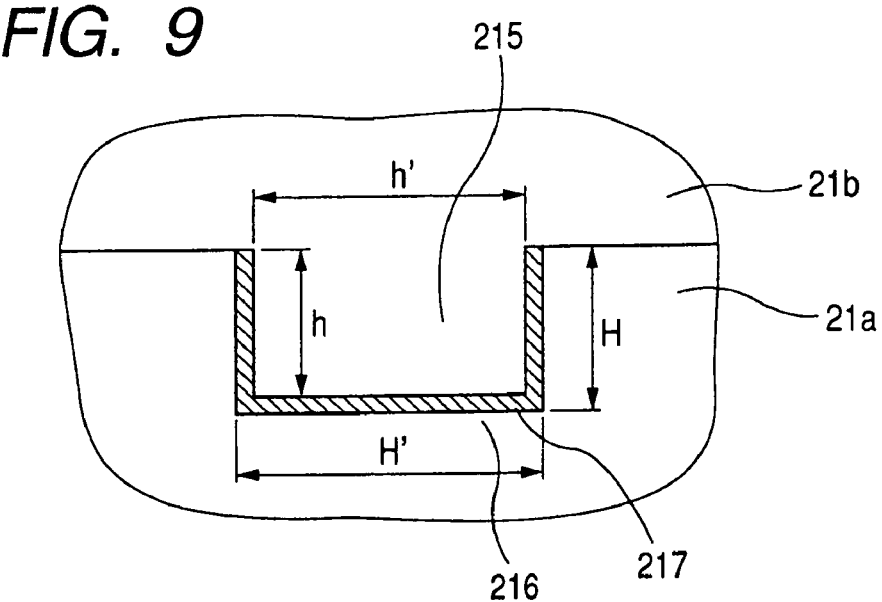
FIG. 9 is a partially cross-sectional view showing a modification of the magnetic pole cores of FIG. 8.

Referring to FIG. 9, it is preferable to fill the gap (H-h, H'-h'), formed between each engaged pair of protrusion 215 and recess 216 of the magnetic pole cores 2A and 3A, with a fluid magnetic member 217. The fluid magnetic member 217 may be made up of a mixture of grease and iron power.

With the fluid magnetic member 217, it is possible to secure a sufficient contact area between the boss portions 21a and 21b of the magnetic pole cores 2A and 3A, preventing the output power of the alternator from decreasing due to an increase in the magneto-resistance between the boss portions 21a and 21b.

Modification 8

In the second embodiment, the protrusion 215 and recess 216 are formed around the radially inner edge of the axial end face of each of the boss portions 21a and 21b of the magnetic pole cores 2A and 3A.

However, the protrusion 215 and recess 216 may instead be formed around the radially outer edge of the axial end face or an intermediate position between the radially inner and outer edges of the axial end face.

Modification 9

Figure 10A:
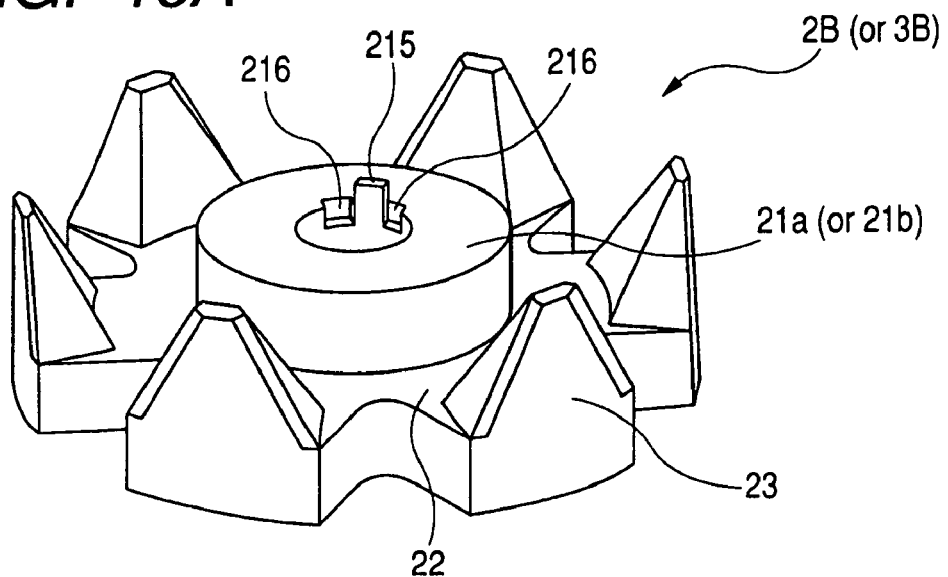
FIGS. 10A and 10B are a perspective view and a partially cross-sectional view, respectively, together showing another modification of the magnetic pole cores of FIG. 8.
Figure 10B:
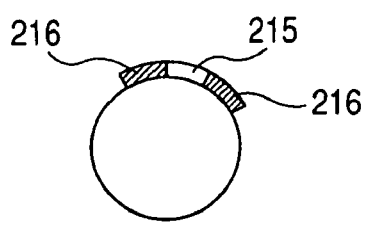

FIGS. 10A and 10B together show a magnetic pole core 2B (or 3B) obtained by modifying the magnetic pole core 2A (or 3A) of the second embodiment.

As shown in those figures, the magnetic pole core 2B (or 3B) has two recesses 216 each on one side of a protrusion 215 in the circumferential direction. Moreover, the circumferential center of each of the recesses 216 is spaced away from the circumferential center of the protrusion 215 by one half of the pitch of the magnetic pole claws 23 of the magnetic pole core 2B (or 3B).

With the above configuration, the magnetic pole cores 2B and 3B can have the same shape, thus making it possible to further reduce the manufacturing cost of the rotor 100A.

Modification 10

Figure 11A:
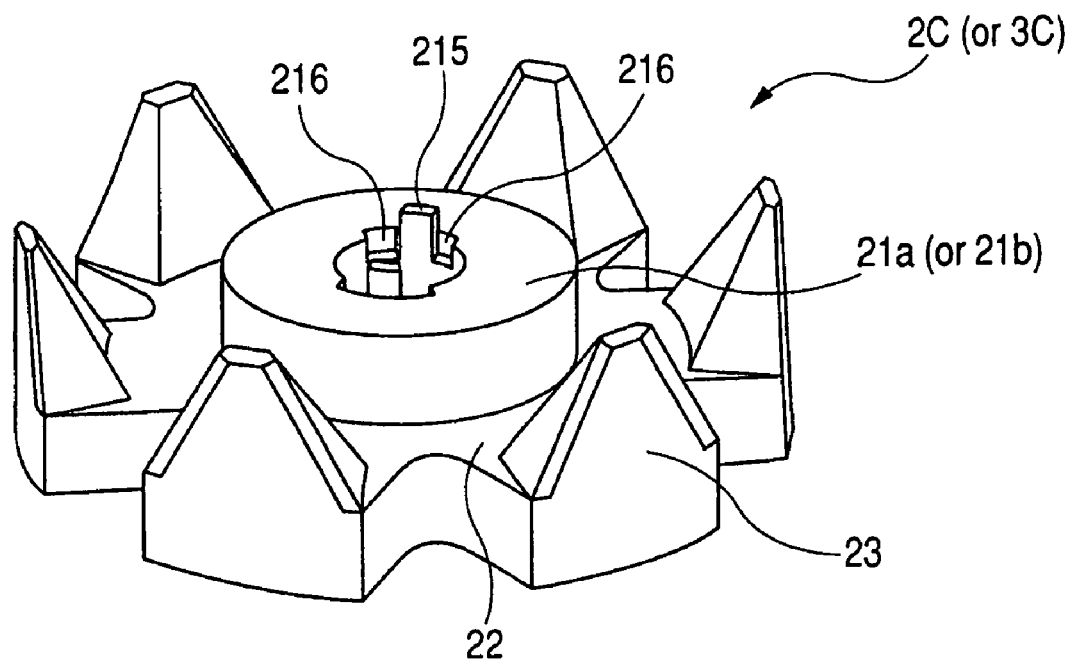
FIGS. 11A and 11B are a perspective view and a partially cross-sectional view, respectively, together showing yet another modification of the magnetic pole cores of FIG. 8.
Figure 11B:
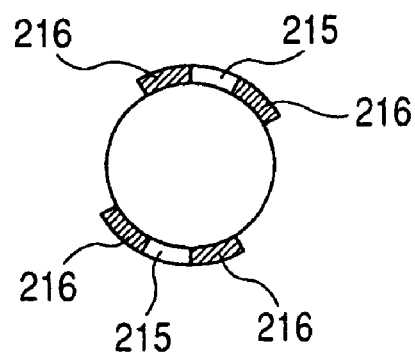

FIGS. 11A and 11B together show a magnetic pole core 2C (or 3C) obtained by further modifying the magnetic pole core 2B (or 3B) described above.

The magnetic pole core 2C (or 3C) has a plurality of sets of protrusion 215 and recesses 216. Those sets are symmetrically located with respect to the central axis of the magnetic pole core 2C (or 3C), and offset from one another by an integral multiple of the pitch of the magnetic pole claws 23 of the magnetic pole core 2C (or 3C). For example, in FIGS. 11A and 11B, there are depicted two sets of protrusion 215 and recesses 216, which are offset from one another by 180°.

With the above configuration, it is possible to more effectively restrict relative movement between the magnetic pole cores 2C and 3C in the circumferential direction.

Third Embodiment

Figure 12:
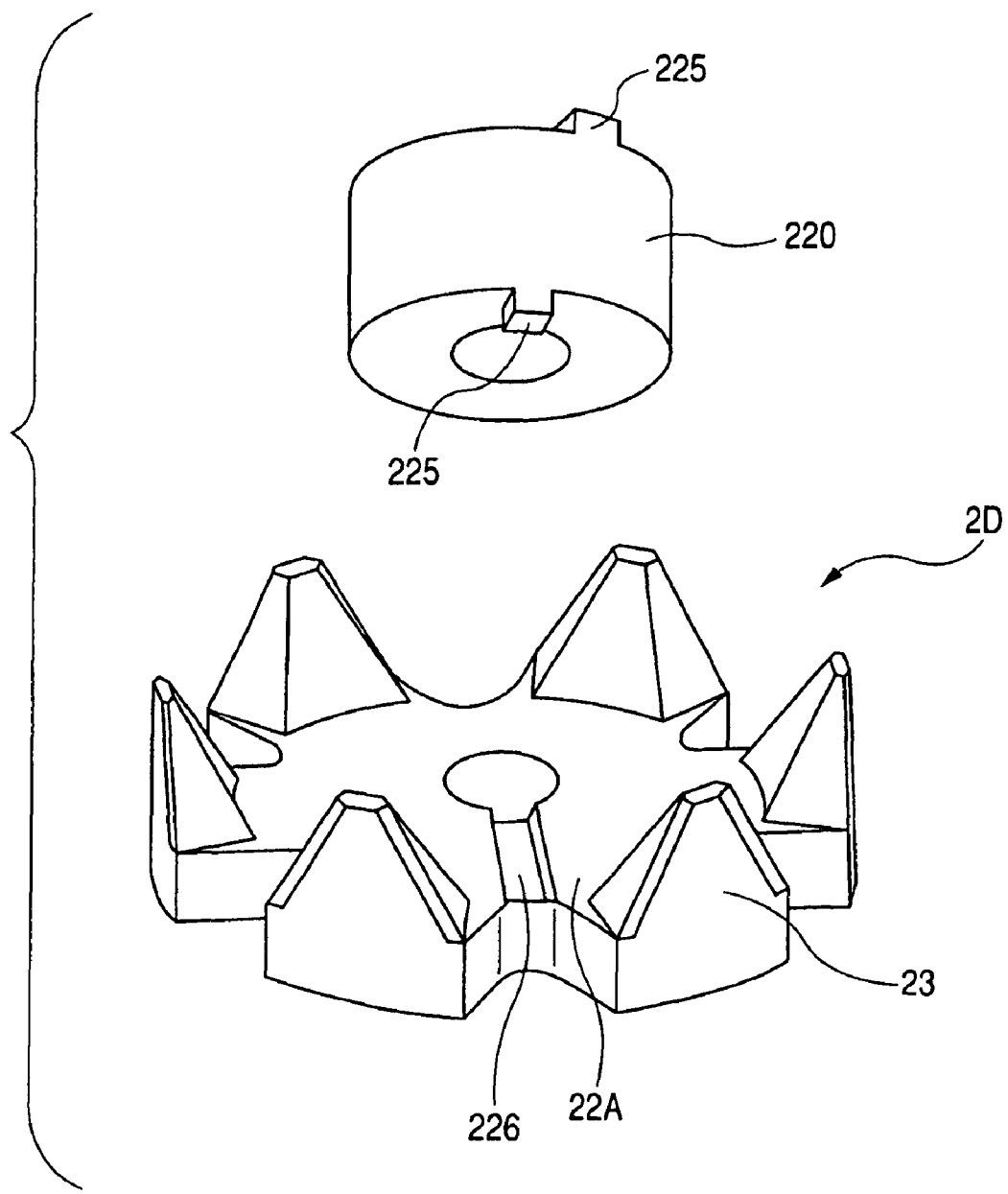
FIG. 12 is a perspective view showing a magnetic pole core of a rotor according to the third embodiment of the invention.

FIG. 12 shows a magnetic pole core 2D of a rotor 100D according to the third embodiment of the invention.

As shown in FIG. 12, the magnetic pole core 2D includes a hollow cylindrical boss portion 220, a disc portion 22A, and a plurality of (e.g., 6) magnetic pole claws 23. As in the previous embodiments, each of the magnetic pole claws 23 is integrally formed with the disc portion 22A to axially extend from a radially outer part of the disc portion 22A. However, the cylindrical boss portion 220 is separately formed from both the disc portion 22A and the magnetic pole claws 23.

Moreover, though shown in FIG. 12, the rotor 100D further includes another magnetic pole core 3D which has the same structure as the magnetic pole core 2D. Thus, the magnetic pole core 3D also includes a boss portion 220, a disc portion 22A, and a plurality of magnetic pole claws 23; the disc portion 22A is integrally formed with the magnetic pole claws 23, but separately formed from the boss portion 220.

Further, in the present embodiment, the boss portions 220 of the magnetic pole cores 2D and 3D are integrally formed with each other. In other words, the magnetic pole cores 2D and 3D have a common boss portion 220.

The common boss portion 220 has two protrusions 225 that respectively protrude from both the axial end faces of the boss portion 220, and are offset from one another in the circumferential direction by an odd multiple of one half of the pitch of the magnetic pole claws 23 of the magnetic pole core 2D.

On the other hand, each of the disc portions 22A of the magnetic pole cores 2D and 3D has a recess 226 that is formed in the inner axial end face of disc portion 22A to engage with a corresponding one of the protrusions 225 of the boss portion 220.

After the assembly of the magnetic pole cores 2D and 3D through the engagements between the protrusions 225 and the recesses 226, each of the magnetic pole claws 23 of the magnetic pole core 2D is circumferentially positioned at the center of the interval between one adjacent pair of the magnetic pole claws 23 of the magnetic pole core 3D; vice versa, each of the magnetic pole claws 23 of the magnetic pole core 3D is circumferentially positioned at the center of the interval between one adjacent pair of the magnetic pole claws 23 of the magnetic pole core 2D.

As above, in the rotor 100D according to the present embodiment, there is provided a positioning mechanism that is made up of the pair of protrusions 225 of the common boss portion 220 and the recesses 226 of the disc portions 22A of the magnetic pole cores 2D and 3D.

With the positioning mechanism, the magnetic pole cores 2D and 3D are accurately positioned in the circumferential direction of the rotary shaft 1, with the intervals between adjacent pairs of the magnetic pole claws 23 of the magnetic pole cores 2D and 3D being even. Consequently, it is possible to securely hold the permanent magnets 6 between the adjacent pairs of the magnetic pole claws 23 during high-speed rotation of the rotor 100D.

Moreover, since no guidance device is required for guiding the magnetic pole cores 2D and 3D to desired positions in the assembly step, the manufacturing cost of the rotor 100D is kept from increasing.

In addition, the rotor 100D according to the present embodiment can be made in the same way as the rotor 100 according to the first embodiment.

Modification 11

In the third embodiment, as described above, both the protrusions 225 are provided in the boss portion 220, while each of the recesses 226 is provided in one of the disc portions 22A.

However, it is possible to provide both the recesses 226 in the boss portion 220, while providing each of the protrusions 225 in one of the disc portions 22A.

Moreover, it is also possible to provide the protrusions 225 respectively in the boss portion 220 and one of the disc portions 22A, while providing the recesses 226 respectively in the boss portion 220 and the other disc portion 22A.

Fourth Embodiment

Figure 13:
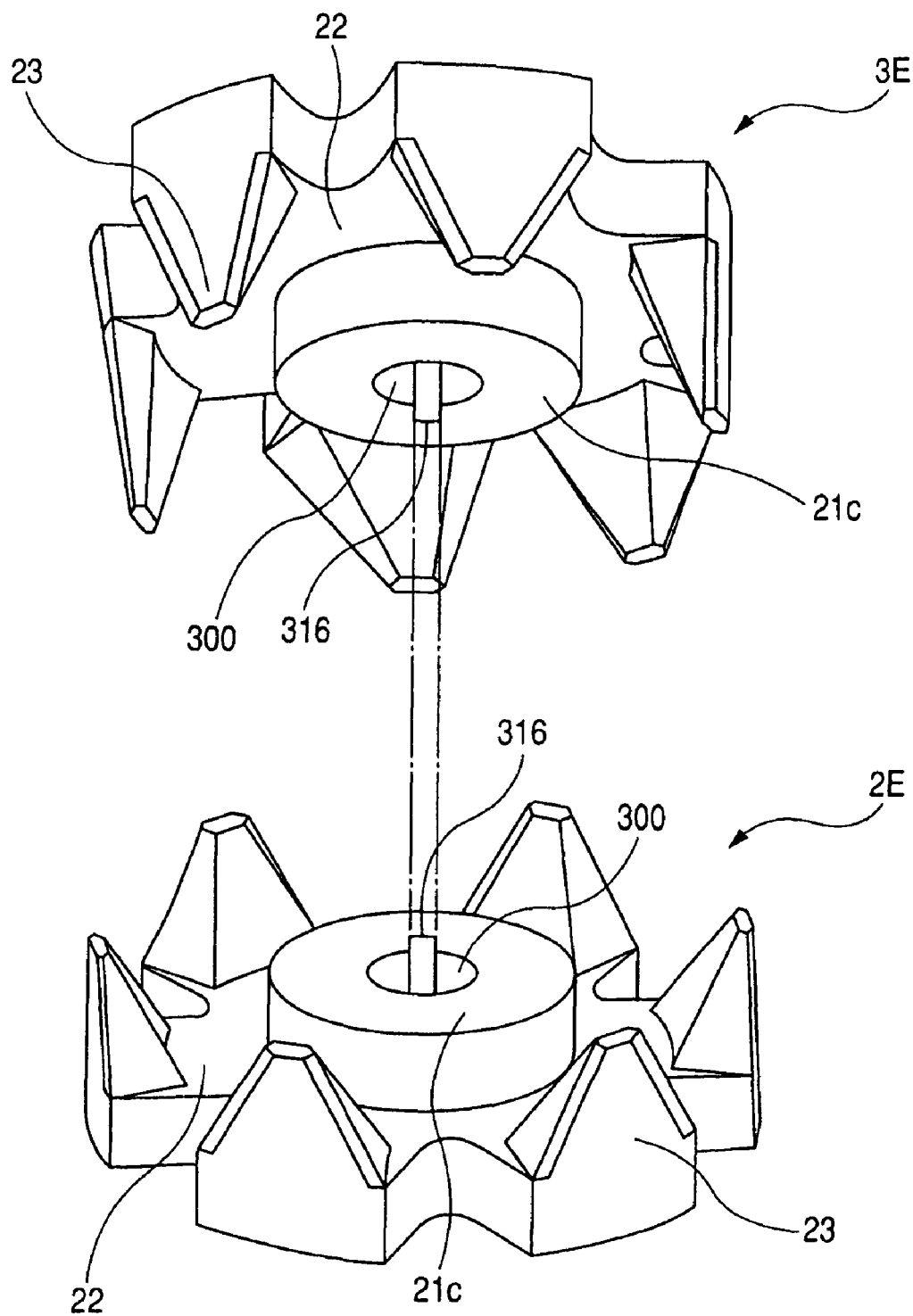
FIG. 13 is a perspective view showing magnetic pole cores of a rotor according to the fourth embodiment of the invention.

FIG. 13 shows a pair of magnetic pole cores 2E and 3E of a rotor 100E according to the fourth embodiment of the invention.

As shown in FIG. 13, each of the magnetic pole cores 2E and 3E has a recess 316 that is formed in the radially inner surface 300 of the boss portion 21c to extend in the axial direction. Moreover, the relative circumferential position of the recess 316 to the magnetic pole claws 23 in the magnetic pole core 2E is different from that in the magnetic pole core 3E by one half of the pitch of the magnetic pole claws of the magnetic pole core 2E.

On the other hand, though not shown in FIG. 13, the rotary shaft 1 has two protrusions that are formed on the outer surface of the rotary shaft 1 to respectively engage with the recesses 316 of the magnetic pole cores 2E and 3E. Moreover, the circumferential positions of the two protrusions are the same.

After the assembly of the magnetic pole cores 2E and 3E and the rotary shaft 1 through the engagements between the recesses 316 of the magnetic pole cores 2E and 3E and the protrusions of the rotary shaft 1, each of the magnetic pole claws 23 of the magnetic pole core 2E is circumferentially positioned at the center of the interval between one adjacent pair of the magnetic pole claws 23 of the magnetic pole core 3E; vice versa, each of the magnetic pole claws 23 of the magnetic pole core 3E is circumferentially positioned at the center of the interval between one adjacent pair of the magnetic pole claws 23 of the magnetic pole core 2E.

As above, in the rotor 100E according to the present embodiment, there is provided a positioning mechanism that is made up of the recesses 316 of the magnetic pole cores 2E and 3E and the protrusions of the rotary shaft 1.

With the positioning mechanism, the magnetic pole cores 2E and 3E are accurately positioned in the circumferential direction of the rotary shaft 1, with the intervals between adjacent pairs of the magnetic pole claws 23 of the magnetic pole cores 2E and 3E being even. Consequently, it is possible to securely hold the permanent magnets 6 between the adjacent pairs of the magnetic pole claws 23 during high-speed rotation of the rotor 100E.

Moreover, since no guidance device is required for guiding the magnetic pole cores 2E and 3E to desired positions in the assembly step, the manufacturing cost of the rotor 100E is kept from increasing.

In addition, the rotor 100E according to the present embodiment can be made in the same way as the rotor 100 according to the first embodiment.

Modification 12

It is also possible to configure the relative circumferential position of the recess 316 to the magnetic pole claws 23 in the magnetic pole core 2E to be identical to that in the magnetic pole core 3E, with the protrusions of the rotary shaft 1 being offset from one another by one half of the pitch of the magnetic pole claws 23 of the magnetic pole core 2E.

With the above configuration, the magnetic pole cores 2E and 3E can have the same shape, thus making it possible to further reduce the manufacturing cost of the rotor 100E.

While the above particular embodiments and modifications of the invention have been shown and described, it will be understood by those skilled in the art that further modifications, changes, and improvements may be made without departing from the spirit of the invention.

What is claimed is:

1. A rotor for an automotive alternator, comprising:
a rotary shaft;
a pair of first and second magnetic pole cores each of which includes a hollow cylindrical boss portion, a disc portion, and a plurality of magnetic pole claws, the boss portion being fit on the rotary shaft to rotate along with the rotary shaft, the disc portion extending radially outward from an axially outer part of the boss portion, each of the magnetic pole claws axially extending from a radially outer part of the disc portion, the magnetic pole claws of the first magnetic pole core being interleaved with the magnetic pole claws of the second magnetic pole core;
a bobbin fit on both the boss portions of the first and second magnetic pole cores;
a field coil wound around the bobbin;
a plurality of permanent magnets each of which is interposed between adjacent two of the magnetic pole claws of the first and second magnetic pole cores in a circumferential direction of the rotary shaft, so as to reduce magnetic flux leakage between the two magnetic pole claws; and
a positioning mechanism made up of at least one of the rotary shaft, the first and second magnetic pole cores, and the bobbin, the positioning mechanism functioning to position the first and second magnetic pole cores in the circumferential direction of the rotary shaft with intervals between adjacent pairs of the magnetic pole claws of the first and second magnetic pole cores being even, wherein
both the boss portions of the first and second magnetic pole cores are integrated into a common boss portion to the first and second magnetic pole cores,
the common boss portion has two first engaging portions that are respectively provided on both axial end faces of the common boss portion,
each of the disc portions of the first and second magnetic pole cores has a second engaging portion that is provided on an axial end face of the disc portion to engage with a corresponding one of the first engaging portions of the common boss portion,
the first engaging portions of the common boss portion and the second engaging portions of the disc portions of the first and second magnetic pole cores together make up the positioning mechanism, and
for each engaging pair of the first engaging portions of the common boss portion and the second engaging portions of the disc portions, one of the first and second engaging portions is a protrusion from its respective axial end face and the other is a recess within its respective end face.

2. The rotor as set forth in claim 1, wherein the two first engaging portions of the common boss portion are offset from one another in the circumferential direction by an odd multiple of one half of the pitch of the magnetic pole claws of the first magnetic pole core.

3. The rotor as set forth in claim 1, further comprising a magnetic member that is provided inside at least one of the first engaging portions of the common boss portion and the second engaging portions of the disc portions of the first and second magnetic pole cores.

* * * * *